United States Patent
Parker et al.

(10) Patent No.: US 9,912,357 B1
(45) Date of Patent: Mar. 6, 2018

(54) DIGITAL POLAR TRANSMITTER HAVING A DIGITAL FRONT END

(71) Applicant: Intel IP Corporation, Santa Clara, CA (US)

(72) Inventors: Uri Parker, Shimshit (IL); Elan Banin, Raanana (IL); Michael Kerner, Tel Mond (IL); Ofir Degani, Haifa (IL)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/382,808

(22) Filed: Dec. 19, 2016

(51) Int. Cl.
*H04B 1/02* (2006.01)
*H02M 1/12* (2006.01)
*G11B 20/10* (2006.01)
*H02P 27/08* (2006.01)

(52) U.S. Cl.
CPC ............... *H04B 1/02* (2013.01); *H02M 1/12* (2013.01); *G11B 20/1024* (2013.01); *G11B 20/10055* (2013.01); *H02P 27/08* (2013.01)

(58) Field of Classification Search
CPC .... H02P 27/08; H02M 1/12; G11B 20/10055; G11B 20/1024
See application file for complete search history.

(56) References Cited

U.S. PATENT DOCUMENTS

| | | | |
|---|---|---|---|
| 7,817,747 B2 | 10/2010 | Waheed et al. | |
| 7,826,554 B2 | 11/2010 | Haque et al. | |
| 8,009,765 B2 | 8/2011 | Ahmed et al. | |
| 8,204,107 B2 | 6/2012 | Zhuang et al. | |
| 8,270,273 B2* | 9/2012 | Wu | G11B 20/10009 369/44.27 |
| 2010/0061128 A1* | 3/2010 | Nakamoto | H02M 1/12 363/126 |
| 2011/0129037 A1 | 6/2011 | Staszewski et al. | |
| 2014/0232309 A1* | 8/2014 | Zhou | H02P 27/08 318/400.02 |

* cited by examiner

*Primary Examiner* — Janice Tieu
(74) *Attorney, Agent, or Firm* — Eschweiler & Potashnik, LLC

(57) ABSTRACT

A digital polar transmitter arrangement having a digital front end (DFE) and a transmit chain is disclosed. The DFE is configured to resample a baseband signal relative to a carrier frequency at a carrier frequency related sample rate, calculate zero crossing positions of the resampled signal, generate delay to time converter (DTC) commands based on the zero crossing positions, calculate amplitude values for the zero crossing positions and generate dynamic phase alignment (DPA) commands based on the amplitude values. The transmit chain is configured to generate an output signal having amplitude and phase modulation based on the DTC and DPA commands.

21 Claims, 6 Drawing Sheets

DIGITAL POLAR TRANSMITTER HAVING A DIGITAL FRONT END

BACKGROUND

Wireless communication is commonly used for mobile communication and the like. Typically, a transmitter uses a modulation technique to attach information to a bandpass channel or carrier frequency as a radio frequency (RF) signal. The transmitter then amplifies and transmits the RF signal via an antenna. The RF signal is received at a receiver and demodulated in order to obtain or extract the transmitted information.

Various modulation techniques can be used by transmitters to generate RF signals. These techniques include quadrature modulation, polar modulation and the like. Polar modulation is a technique where amplitude modulation and phase modulation are used in combination to generate an RF signal. One type of polar modulation is digital polar modulation, where amplitude and phase modulation of a carrier signal is performed in the digital domain. A digital polar transmitter uses digital polar modulation to generate RF signals using less power and lower complexity components, i.e., digital components instead of using analog components as compared with analog transmitters. However, the power consumption of a digital polar transmitter does not scale based on an analog transmission signal.

However, the computation and calculation involved in digital polar modulation can be complex and difficult to implement.

DETAILED DESCRIPTION

Figure 1:
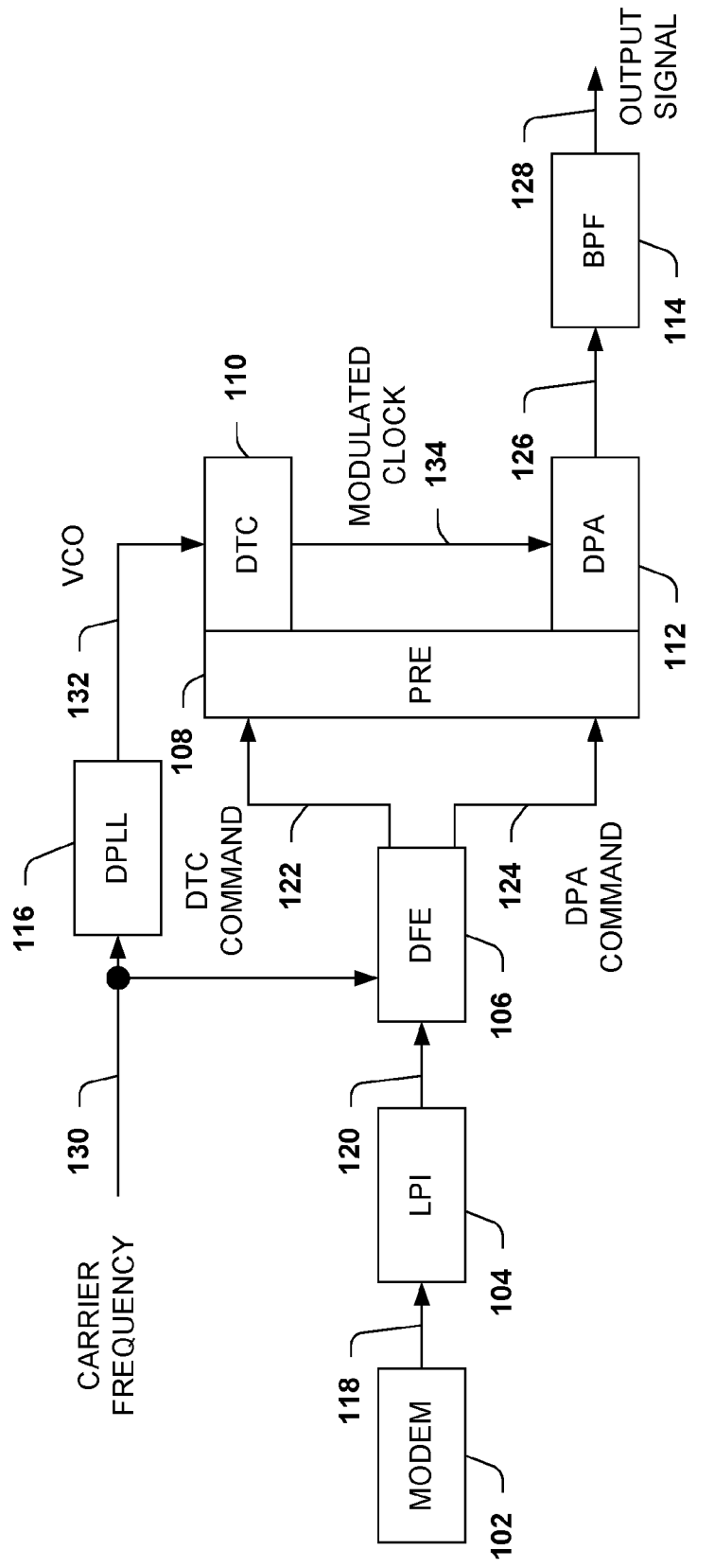
FIG. 1 is a diagram illustrating an exemplary digital transmitter (DTx) arrangement in accordance with an aspect of present disclosure.

The systems and methods of this disclosure are described with reference to the attached drawing figures, wherein like reference numerals are used to refer to like elements throughout, and wherein the illustrated structures and devices are not necessarily drawn to scale.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC, an electronic circuit and/or a mobile phone with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising".

As used herein, the term "circuitry" may refer to, be part of, or include an Application Specific Integrated Circuit (ASIC), an electronic circuit, a processor) shared, dedicated, or group), and/or memory(shared, dedicated, or group) that execute one or moresoftware or firmware programs, a combinational logic circuit, and/or other suitable hardware components that provide the described functionality. In some embodiments, implemented in the circuitry may be, or functions associated with the circuitry may be implemented by, one or more software or firmware modules. In some embodiments, circuitry may include logic, at least partially operable in hardware.

Transmitters for wireless communication can utilize varied modulation and transmission techniques. For example, a polar transmitter can utilize digital or analog polar modulation techniques. The modulation data is represented by amplitude and phase modulation instead of real and quadrature components and modulation. An analog polar transmitter uses analog polar modulation and analog components. A digital polar transmitter (DTX) utilizes digital polar modulation and transmission techniques.

For amplitude modulation, the DTX uses a digital amplifier to convert amplitude digital data to signal power. For phase modulation, phase digital data is converted to phase modulation by Delay to Time Converter (DTC).

Aspects of present disclosure are disclosed that include a digital front end (DFE) within a DTx to calculate commands for digital phase modulation and digital amplitude modulation. The DFE derives the commands, also referred to as codes, in the Cartesian domain without requiring digital phase domain processing. The Cartesian domain includes the in-phase quadrature (IQ) domain. The DFE utilizes zero crossing information to derive the commands without converting the IQ modulation components to Polar components.

FIG. 1 is a diagram illustrating an exemplary digital transmitter (DTx) arrangement 100 in accordance with an embodiment. The arrangement 100 uses relatively low power and a digital flow to calculate digital commands from a Cartesian baseband signal. The arrangement 100 is shown with various components. However, it is appreciated that shown components can be omitted and/or other components added.

The arrangement 100 includes a modem 102, a low power interpolator (LPI) 104, a digital front end (DFE) 106, a digital pre-distortion component 108, a delay to time converter (DTC) 110, a dynamic phase alignment (DPA) component 112, a band pass filter (BPF) 114 and a digital phase locked loop (DPLL) 116.

The modem 102 is configured to generate a baseband signal 118. The baseband signal 118 is modulated, in this example using Cartesian components including in-phase (I) components and quadrature (Q) components. Thus, the baseband signal 118 is a Cartesian baseband signal. The baseband signal 118 operates at a suitable baseband frequency, such as 320 Mega Hertz (MHz), 640 MHz and the like.

The LPI 104 is configured to receive the baseband signal 118 and generate an interpolated baseband signal 120 at a adjusted frequency. In one example, the LPI 104 includes a variable rate converter (VRC) configured to resample data of the baseband signal 118 at a rate related to a carrier frequency to be used by the arrangement 100. The VRC uses relatively low power via a low sample rate, based on fractional delay filtering. The LPI 104 further adjusts the frequency of the baseband signal to generate the interpolated baseband signal 120. In one example, the interpolated baseband signal 120 is adjusted to the adjusted frequency of about 2560 MHz from the baseband frequency of 640 MHz. The adjusted frequency permits operation and calculation of digital commands with less or reduced power consumption and complexity.

The DFE 106 is configured to generate digital commands including DTC commands 122 and DPA commands 124 based on the interpolated baseband signal 120 using a carrier frequency 130. The digital commands 122 and 124 are also referred to as code words and are used to generate an output signal for polar transmission. The DFE 106 also utilizes the carrier frequency, also referred to as a carrier signal. The processing performed by the DFE 106 is performed in the digital domain.

The carrier frequency 130 is a high frequency signal for carrying information contained in the baseband signal 118. The carrier frequency 130 is at a relatively high frequency greater than that of the baseband signal 118. In one example, a divider component (not shown) is configured to divide the carrier frequency 130 where the DFE 106 utilizes the divided carrier frequency instead of the carrier frequency 130.

The DFE 106 is configured to resample the baseband signal 120 or utilizes the prior sampling into carrier frequency related samples at a carrier frequency related sample rate. This sampling simplifies following calculations and mitigates power consumption.

The DFE 106 is also configured to locate zero crossing times based on the interpolated baseband signal 120. In one example, the signal 120 is up-sampled and mixed with the carrier frequency. The mixed signal is used to apply and detect zero crossing. The carrier frequency related sample rate reduces power consumption and computational complexity by having a lower number of samples. The DFE 106 can also include fixed and simple filters due to the Fc/Fs being fixed, where Fc is the carrier frequency and Fs is the sampling rate.

The DFE 106 is configured to compute amplitudes at the located or identified zero crossing times. The computed amplitudes are provided as the DPA commands 124. Again, the carrier frequency related sampling rate (Fs) results in low power consumption and reduced computational complexity.

The DFE 106 is also configured to convert zero crossing information for the zero crossing times into the DTC commands 122. In one example, the conversion is performed using a bit extraction operation, in part due to the resampling by the VRC. Without the VRC, the conversion involves a large multiplier.

It is appreciated that the LPI 104 and/or the VRC can be incorporated within the DFE 106.

The DPLL 116 is configured to generate a voltage controlled oscillator (VCO) signal 132 based on the carrier frequency 130. The DPLL 116 generates and synchronizes the VCO signal 132 with the carrier frequency 130. The VCO signal 132 is also referred to as a local oscillator (LO) signal and is provided to the DFE 106 and the DTC component 110.

The pre-distortion component 108 is configured to apply a digital pre-distortion to the DTC commands 122 and the DPA commands 124. The digital pre-distortion can be generated at least partially based on a feedback signal. The applied digital pre-distortion can at least partially account for non-linear operation of a power amplifier used in a subsequent stage. It is appreciated that the pre-distortion component 108 can be omitted.

The DTC component 110 is configured to generate a modulated clock based on the VCO signal 132 and the DTC commands 122. The DTC component 110 performs phase modulation using the DTC commands 122. In one example, a digitally controlled edge interpolator (DCEI) is used as part of or with the DTC component 110 to convert the phase digital data, the DTC commands 122, to phase modulation or edge delay of the VCO signal 132.

The DPA component 112 is configured to generate a modulated signal 126 based on the DPA commands 124 and the modulated clock 134 from the DTC component 110. The DPA component 112 includes a class D digital power amplifier (DPA), in this example. A class D DPA generally exhibits a more than 40 percent improved efficiency compared to analog class AB power amplifiers. The DPA component 112 generates amplitude modulation using a class D digital switched combiner, switched capacitor DPA from the DPA commands 124 using the modulated clock 134.

The BPF 114 is configured to selectively pass or generate an output signal 128. The BPF 114 removes unwanted components and noise, including out of band harmonics. The output signal 128 includes phase and amplitude modulation. The passed signal or output signal 128 reflects path selectivity. It is appreciated that power amplifier based selectivity could be used to selectively pass the output signal instead of or in addition to using the BPF 114.

The BPF 114, the DPA component 112, the DTC component 110 and the pre-distortion component 108 can be considers as part of a transmit chain.

The output signal 128 can be further processed, including additional amplification and/or filtering and transmitted via an antenna.

Some examples of suitable signals generated and used with the arrangement 100 provided. In one example, the output signal 128 has a bandwidth (BW) of 160 MHz, a carrier frequency (Fchannel) of about 6 GHz and uses 1024 QAM (802.11ax). In another example, the output signal 128 has a bandwidth (BW) of 640 MHz (two simultaneous RF signals with a BW of 80 MHz and frequency spacing of 560 MHz), a carrier frequency (Fchannel) of about 5.5 GHz and uses 1024 QAM (802.11ax).

When the $F_c$ (carrier frequency) dominates the signal bandwidth ($F_c$>>BW) and $F_s$ (sampling rate) is high enough, a linear approximation of zero crossing (ZC) points can be suitable for generating an output signal using polar modulation. This is the case for narrowband signals, such as 20 MHz and the like. However for wideband signals like 160 MHz the data dominates, causing Zero Cross miss detection and large Zero Cross errors. A linear approximation of ZC points is not sufficient.

One approach for polar based calculations is to observe phase samples $\phi[n]$ at sampling rate $F_s$. Since $F_c$>$F_s$, the phase is wrapping-around (namely zero-crossing) according to the carrier and data frequencies. The zero-cross is calculated in the following steps:

Define momentary frequency $F_m=F_c+(\phi[n]-\phi[n-1])$
Number of zero-crossing per sample $N_{zc}[n]=\text{floor}(F_m/F_s)$
Unwrap end phase $\phi_{unwrap}[n]=\phi[n]+2\pi \cdot N_{zc}[n]$
Allocate $N_{zc}[n]$ phase points by linear interpolation between $\phi[n-1]$ and $\phi_{unwrap}[n]$. However, as shown above, this linear interpolation/approximation may not be suitable for some applications, such as wide bandwidth applications.

The DFE 106 utilizes an approach where the zero crossing times can be directly calculated from a desired RF or output signal Y(t). The approach includes:

Resample the baseband signal Z(t)
Calculate Y(t)
Look for sign changes (zero crosses)
Calculate exact position by using a linear interpolation.

The approach utilized by the DFE 106 reduces polar ZC errors and IQ ZC errors, relative to a carrier cycle. For example, a calculated zero crossing error (from the zero crossing time of the desired signal Y(t)) on an OFDM signal with 160 MHz BW ($F_c$=5 GHz) gives the following results):

Polar ZC error: −35 dBc (relative to carrier cycle)
IQ ZC error: −71 dBc (relative to carrier cycle)

It is appreciated that the results are provided for illustrative purposes and that other results and values are obtainable and/or contemplated.

Spectral noise and EVM is also impacted by the use of the DFE 106. It is appreciated that the error in the zero crossing calculation is not the main cause of the in-band error. EVM (error vector magnitude) is typically limited by non-linearity effects. Therefore, about a ~1 dB improvement can be seen in EVM. However this low IQ ZC error may be required for following non-linearity elimination algorithms. Out of band noise is generally improved using the DFE 106 as compared with other approaches.

Figure 2:
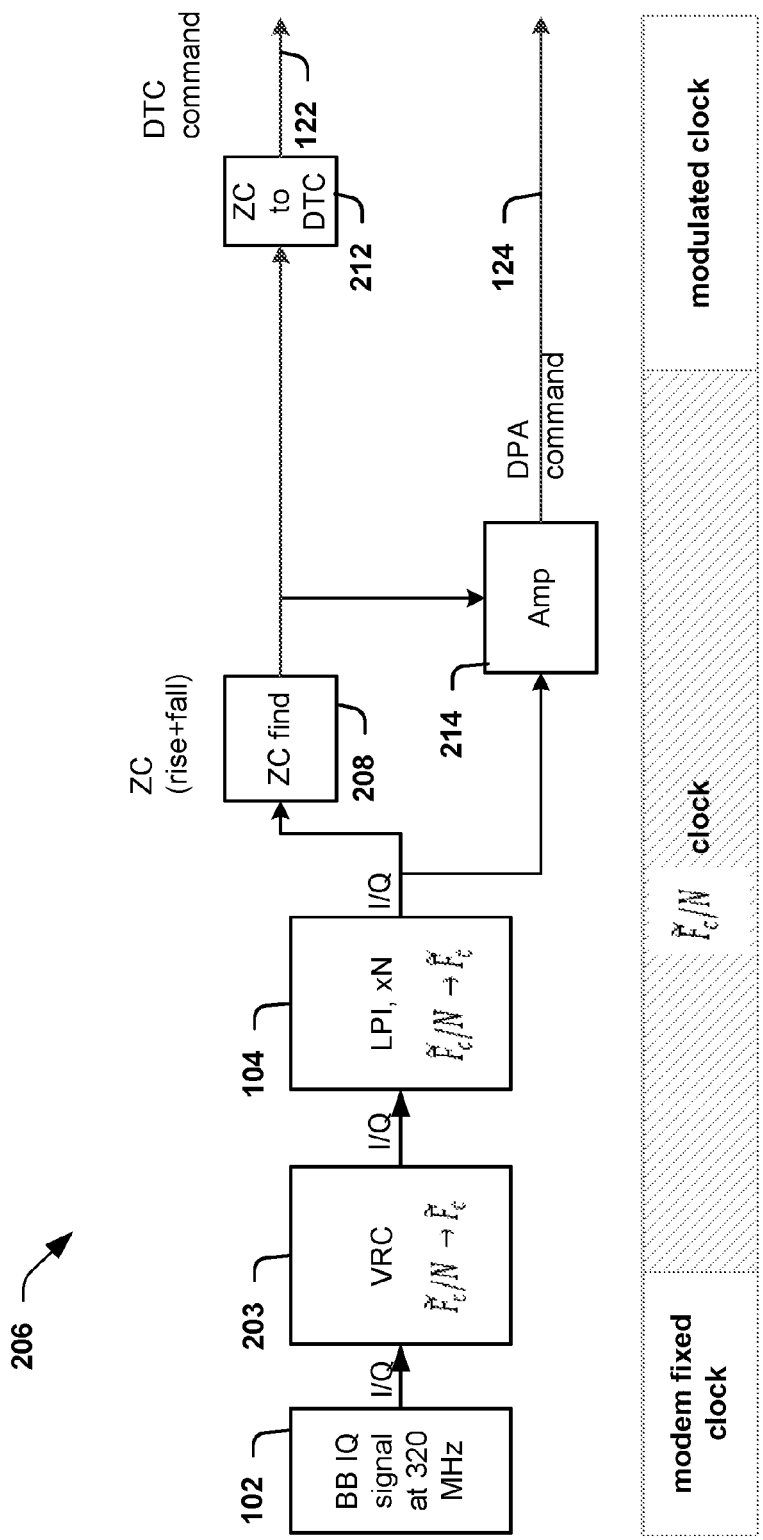
FIG. 2 is a diagram illustrating an exemplary digital front end (DFE) arrangement utilizing zero crossings to generate digital commands for polar modulation in accordance with an aspect of present disclosure.

FIG. 2 is a diagram illustrating a digital front end (DFE) arrangement 206 utilizing zero crossings to generate digital commands for polar modulation in accordance with an embodiment. The arrangement 206 and variations thereof can be utilized as the DFE 106 and the like and used in a DTx.

The arrangement 206 includes a zero crossing (ZC) finder 208, a zero crossings (ZC) correct component 210, a ZC to DCT converter 212 and an amplifier 214. The arrangement 206 utilizes a modem 102, a VRC component 20 and an LPI component 104. It is appreciated that these components and others can be included as part of the DFE 206.

The modem 102 generates a baseband signal having I and Q components at a baseband frequency. In one example, the baseband frequency is 320 MHz, however other suitable frequencies can be used.

The VRC (variable rate converter) 203 is configured to resample data of the baseband signal at a rate related to a carrier frequency. The VRC 203 uses relatively low power via a low sample rate, based on fractional delay filtering. In one example, the VRC 203 is configured to resample the baseband signal at ¼ of the carrier frequency.

The LPI 104 further reduces the frequency of the baseband signal to generate an interpolated baseband signal. In one example, the interpolated baseband signal is adjusted to the adjusted frequency of about 2560 MHz from the baseband frequency of 640 MHz. The adjusted frequency permits operation and calculation of digital commands with less or reduced power consumption and complexity. The interpolated baseband signal is provided to the ZC finder 208 and the power amplifier 214. The interpolated baseband signal is also referred to as a modulated signal.

The ZC finder 208 is configured to calculate ZC positions of the modulated signal. In one example, the ZC positions are calculated by coarsely calculating the modulated signal in a high sampling rate, identifying sign changes. Accuracy of the ZC position calculations can be improved with linear interpolation. The calculated ZC positions, also referred to as a modulated clock, are provided to the amplifier 214.

The ZC to DCT converter 212 is configured to convert the calculated ZC positions to DTC commands 122. The converter 212 uses a low power implementation where DTC commands are extracted from a ZC delay. The extraction is a delay relative to a VCO clock and the ZC delay is relative a digital clock. In one example, bit selection is used where the digital clock is closely related to the VCO clock. An example of the VCO clock is shown above with regard to FIG. 1 and the VCO clock 132 generated by the DPLL 116.

The amplifier 214 is configured to generate DPA commands 124 based on the modulated signal from the LPI component 104 and the calculated ZC positions from the ZC finder 208. The amplifier 218 determines or calculates amplitude values at the calculated ZC positions. A suitable technique, such as linear interpolation of the base-band absolute values, can be utilized.

The operation of the DFE 206 and 106 is further described below. Additional details are provided for illustrated purposes. However, it is appreciated that suitable variations are contemplated.

The baseband signal from the modem 102 can also be referred to as an input signal. The input/baseband signal is given by:

$$Z(t)=I(t)+j\cdot Q(t)=A(t)\cdot \exp(j\cdot \phi(t))$$

The modulated signal (the desired signal) Y(t) is given by:

Cartesian: $Y(t)=I(t)\cdot \cos(2\pi\cdot F_c\cdot t)-Q(t)\cdot \sin(2\pi\cdot F_c\cdot t)$ Polar: $Y(t)=A(t)\cdot \cos(2\pi\cdot F_c\cdot t+\phi(t))$ I(t), Q(t), A(t) and φ(t) are signal real, imaginary, amplitude and phase correspondingly. $F_c$ is the carrier frequency.

The DTx using the DFE 206 can produce a modified polar signal of the following form:

DTx: $Y'(t)=A'(t)\cdot \text{sign}(\cos(2\pi\cdot F_c\cdot t+\phi'(t)))$

This square waveform can be represented in terms of zero-crossing time (DTC command) 122 and amplitude (DPA command) 124.

The sign operation introduces out-of-band harmonics, which can be eliminated by a band-pass filter at the DPA matching network.

The DFE 206 is configured to calculate the DPA and DTC commands (122 and 124) (A'(t), φ'(t)) that will provide an output signal 128 which is close or as close as possible to the required signal:

$$Y''(t)=BPF\{A'(t)\cdot \text{sign}(\cos(2\pi F_c t+\phi'(t)))\}\approx A(t)*\cos(2\pi F_c t+\phi(t))=Y(t)$$

The VRC 203 is utilized to re-sample data at carrier related rate $\tilde{F}_c$ DFE clocking at Fc related clock ensures compact and low power signal processing at high rates (fixed mixing, simple DTC command computation, no carrier drift). The low power VRC 203 is implemented at low sample rate, based on fractional delay filtering.

A weighted linear interpolation to sample the amplitude in the middle of two zero crosses.

The DTC is clocked by the VCO at $F_{vco}$ while the ZC time stamp is located at the digital rate $\tilde{F}_c$.

The time/phase units are converted according to:

$$DTC \text{ command}_{[1/F_{vco}]} = \left(T_{zc_{[\tilde{F}_c]}} \cdot \frac{\tilde{F}_c}{F_{vco}}\right) \text{mod } 1/F_{vco}$$

Note that a fixed-point implementation with zero or limited sample rate drift can be demanding in terms of HW size and power.

Proper $\tilde{F}_c$ selection allows this conversion as a simple bit extract with no sample rate drift.

The DTC commands 122 and the DPA commands can then be used by a digital transmitter (DTx) to generate an output signal for transmission. In one example, a DTC component is configured to generate a modulated clock based on a VCO signal and the DTC commands. A DPA component 112 is configured to generate a modulated signal based on the DPA commands and the modulated clock. A band pass filter can be configured to selectively pass the output signal for transmission.

Figure 3:
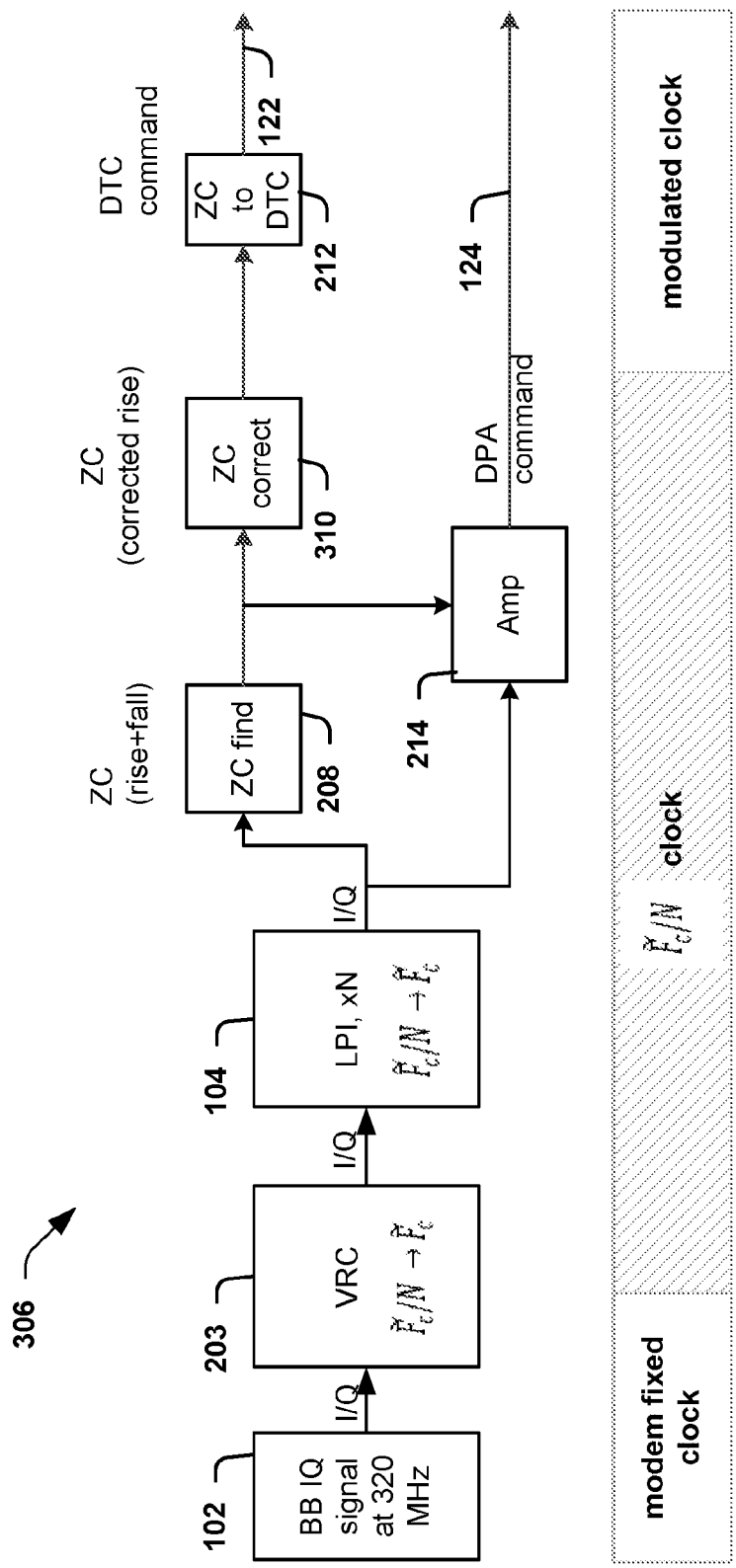
FIG. 3 is a diagram illustrating an exemplary digital front end (DFE) arrangement utilizing zero crossings to generate digital commands for polar modulation in accordance with an aspect of present disclosure.

FIG. 3 is a diagram illustrating a digital front end (DFE) arrangement 306 utilizing zero crossings to generate digital commands for polar modulation in accordance with an embodiment. The arrangement 206 and variations thereof can be utilized as the DFE 106 and the like and used in a DTx. The arrangement 306 and variations thereof can be utilized as the DFE 106.

The arrangement 306 includes a zero crossing (ZC) finder 208, a pre-distortion component 310, a zero crossings (ZC) correct component 210, a ZC to DCT converter 212 and an amplifier 214. The arrangement 206 utilizes a modem 102, a VRC component 20 and an LPI component 104. It is appreciated that these components and others can be included as part of the DFE 306. Additional description for the included components can be found above with regard to FIG. 2.

The modem 102 generates a baseband signal having I and Q components at a baseband frequency. The VRC (variable rate converter) 203 is configured to resample data of the baseband signal at a rate related to a carrier frequency. The VRC 203 uses relatively low power via a low sample rate, based on fractional delay filtering. The LPI 104 further reduces the frequency of the baseband signal to generate an interpolated baseband signal. In one example, the interpolated baseband signal is adjusted to the adjusted frequency of about 2560 MHz from the baseband frequency of 640 MHz. The adjusted frequency permits operation and calculation of digital commands with less or reduced power consumption and complexity. The interpolated baseband signal is provided to the ZC finder 208 and the power amplifier 214. The interpolated baseband signal is also referred to as a modulated signal.

The ZC finder 208 is configured to calculate ZC positions of the modulated signal. In one example, the ZC positions are calculated by coarsely calculating the modulated signal in a high sampling rate, identifying sign changes. Accuracy of the ZC position calculations can be improved with linear interpolation. The calculated ZC positions, also referred to as a modulated clock, are provided to the amplifier 214.

The ZC correct component 310 performs a correction on rising edges of the modulated signal. The correction can also be referred to as a pre-distortion. The falling edges are in a constant or substantially constant offset of the rising edges. The ZC correct component 310 is configured to utilize required falling edges positions and a predetermined or known offset to calculate an expected error of the falling edges. Then, the expected error of the falling edges is used to generate an error for the rising edges. This error is added to the rising edges to obtain a total error with a zero mean, in one example. Thus, the expected error is compensated by adding a negative error on the rising edges to obtain the total error with a zero mean.

In another example, the ZC correct component 310 is configured to utilize required rising edge positions and a known offset to calculate an expected error of the rising edges. Then, the expected error of the rising edges is used to generate an error for the falling edges. The expected error here is compensated for by adding a negative error on the falling edges to obtain a total error with a zero mean.

It is appreciated that the ZC correction component 310 can perform edge correction for rising edges and falling edges as shown above. It is further appreciated that the ZC correction component 310 can also perform edge correction on both rising and falling edges. Performing edge correction on only one of the edges can mitigate power consumption while providing suitable edge correction.

The ZC to DCT converter 212 is configured to convert the calculated ZC positions, after correction to DTC commands 122. The converter 212 uses a low power implementation where DTC commands are extracted from a ZC delay. The extraction is a delay relative to a VCO clock and the ZD delay is relative a digital clock. In one example, bit selection is used where the digital clock is closely related to the VCO clock. An example of the VCO clock is shown above with regard to FIG. 1 and the VCO clock 132 generated by the DPLL 116.

The amplifier 214 is configured to generate DPA commands 124 based on the modulated signal from the LPI component 104 and the calculated ZC positions from the ZC finder 208. The amplifier 218 determines or calculates amplitude values at the calculated ZC positions. A suitable technique, such as linear interpolation of the base-band absolute values, can be utilized.

The DTC commands 122 and the DPA commands 124 can then be utilized to generate an output signal for transmission as described above.

Figure 4:
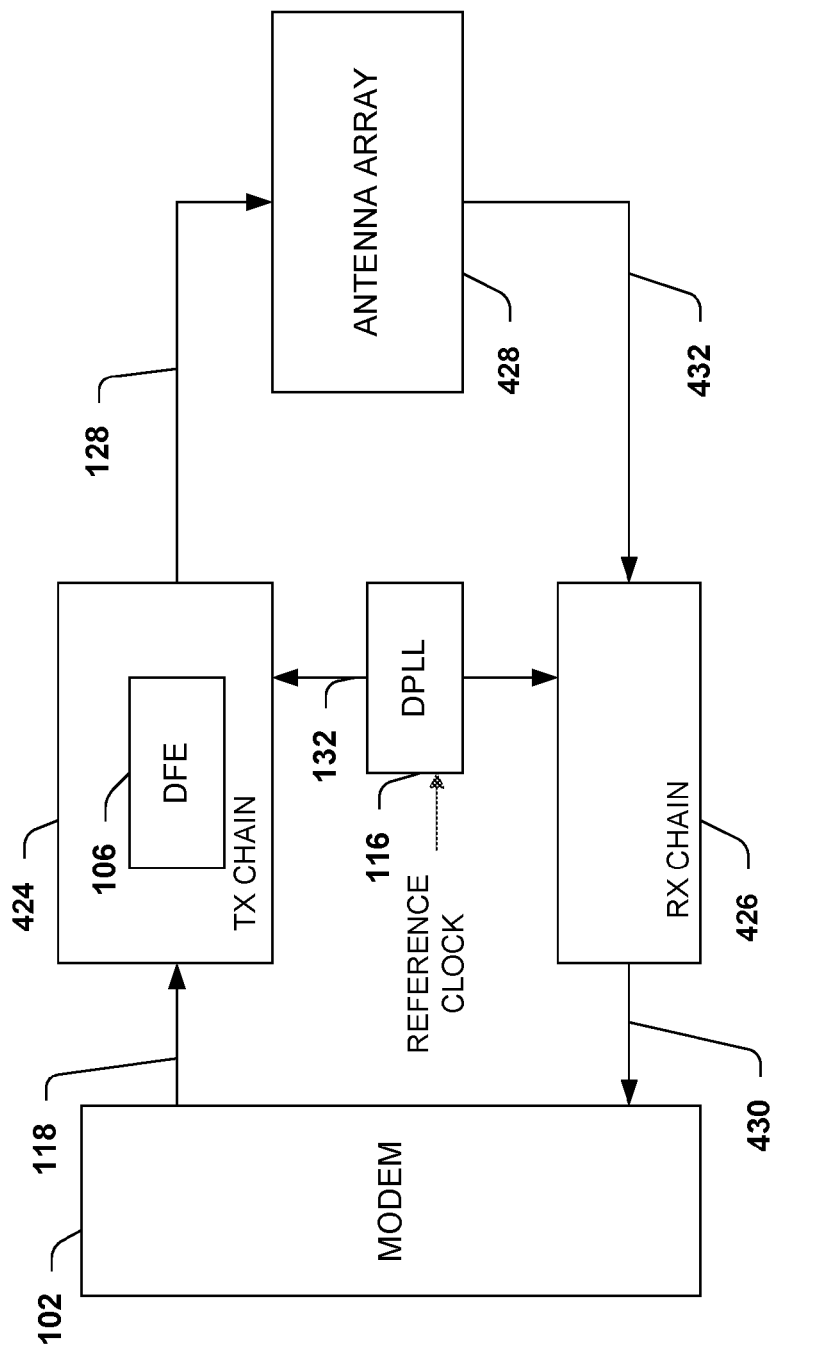
FIG. 4 is a diagram illustrating an exemplary transceiver arrangement in accordance with an aspect of present disclosure.

FIG. 4 is a diagram illustrating a transceiver arrangement 400 in accordance with an aspect of present disclosure. The arrangement 400 utilizes a DTx with a DFE. The DFE utilizes zero crossings of a modulated signal to generate digital commands including DPA commands and DTC commands. The arrangement 400 is provided as an example for illustrative purposes.

The arrangement 400 includes a modem 102, a transmission (TX) chain 424, a DPLL 116, a receive (RX) chain 426 and an antenna array 428. It is appreciated other components can be included.

The RX chain 426 is configured to receive an incoming or received signal 432 from the antenna array 428. The array 428 includes one or antenna for sending and/or receiving signals. The array 428 can include other components including, for example, a duplexer, impedance matching, filters, amplifiers, and the like.

The RX chain 426 converts and process the received signal 432 to generate a received baseband signal 430. The processing includes mixing, downconverting, demodulation and the like. The RX chain 426 can use a local oscillator signal from the DPLL 116.

The TX chain 424 receives a baseband signal 118 from the modem 102 and generates an output signal 129 for transmission from the baseband signal 118. The output signal 128 is provided to the antenna array 428 for transmission.

The TX chain 424 includes a DFE 106, which can be implemented as the DFE 106 described with regards to FIG. 1, the DFE 206 described above, and the like. The DFE 106 utilizes a VCO signal 132 from the DPLL 116 to generate the output signal 118.

The arrangement 400 can be utilized within a mobile communications device, such as a user equipment (UE) and the like.

Figure 5:
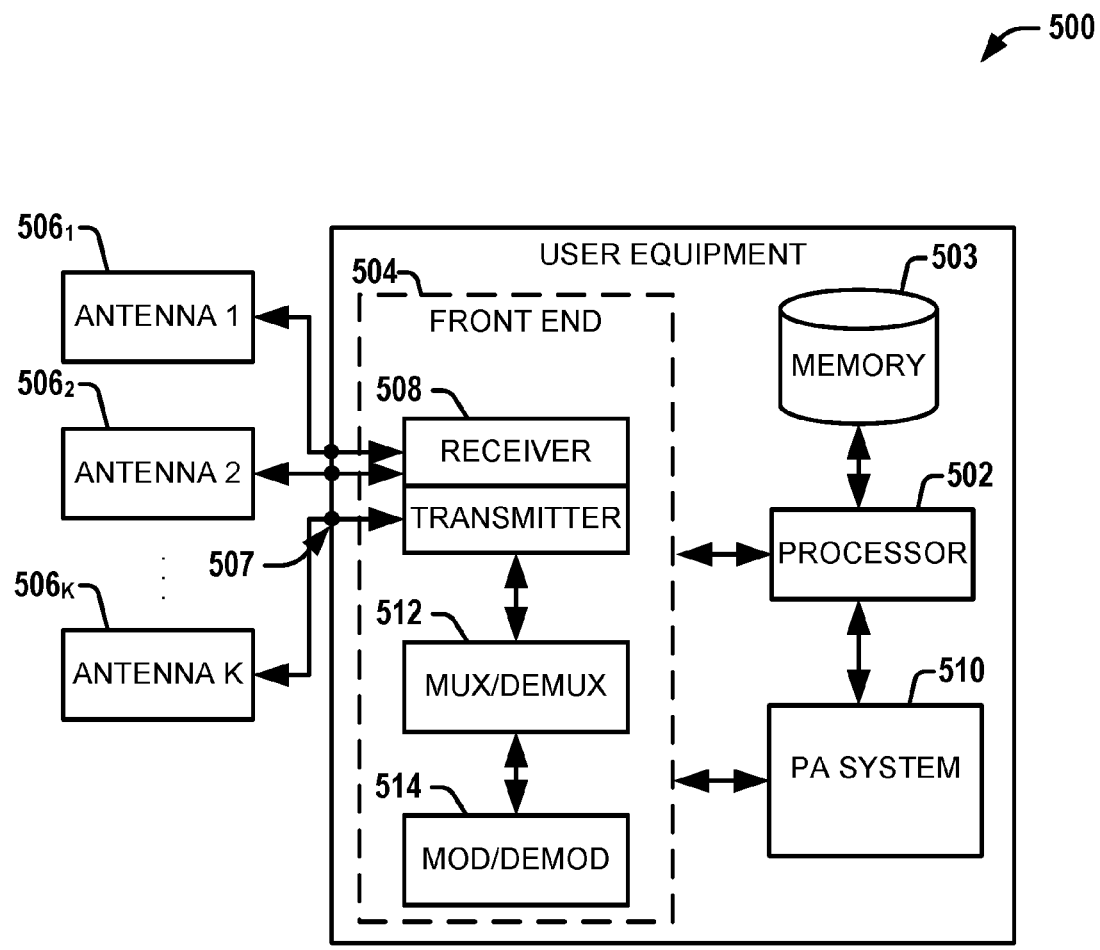
FIG. 5 is a diagram illustrating an exemplary user equipment or mobile communication device.

FIG. 5 is a diagram illustrating an exemplary user equipment or mobile communication device 500 that can be utilized with the one or more embodiments described above.

The mobile communication device 500, for example, comprises a digital baseband processor 502 that can be coupled to a data store or memory 503, a front end 504 (e.g., an RF front end, an acoustic front end, or the other like front end) and a plurality of antenna ports 507 for connecting to a plurality of antennas $506_1$ to $506_k$ (k being a positive integer). The antennas $506_1$ to $506_k$ can receive and transmit signals to and from one or more wireless devices such as access points, access terminals, wireless ports, routers and so forth, which can operate within a radio access network or other communication network generated via a network device. The user equipment 500 can be a radio frequency (RF) device for communicating RF signals, an acoustic device for communicating acoustic signals, or any other signal communication device, such as a computer, a personal digital assistant, a mobile phone or smart phone, a tablet PC, a modem, a notebook, a router, a switch, a repeater, a PC, network device, base station or a like device that can operate to communicate with a network or other device according to one or more different communication protocols or standards.

The front end 504 can include a communication platform, which comprises electronic components and associated circuitry that provide for processing, manipulation or shaping of the received or transmitted signals via one or more receivers or transmitters 508, a mux/demux component 512, and a mod/demod component 514. The one or more transmitters 508 can include a DTx, such as the DTx arrangements described above, which facilitates generation of the transmitted signals.

The front end 504, for example, is coupled to the digital baseband processor 502 and the set of antenna ports 507, in which the set of antennas 506, to $506_k$ can be part of the front end.

The user equipment device 500 can also include a processor 502 or a controller that can operate to provide or control one or more components of the mobile device 500. For example, the processor 502 can confer functionality, at least in part, to substantially any electronic component within the mobile communication device 500, in accordance with aspects of the disclosure.

The processor 502 can operate to enable the mobile communication device 500 to process data (e.g., symbols, bits, or chips) for multiplexing/demultiplexing with the mux/demux component 512, or modulation/demodulation via the mod/demod component 514, such as implementing direct and inverse fast Fourier transforms, selection of modulation rates, selection of data packet formats, inter-packet times, etc. Memory 503 can store data structures (e.g., metadata), code structure(s) (e.g., modules, objects, classes, procedures, or the like) or instructions, network or device information such as policies and specifications, attachment protocols, code sequences for scrambling, spreading and pilot (e.g., reference signal(s)) transmission, frequency offsets, cell IDs, and other data for detecting and identifying various characteristics related to RF input signals, a power output or other signal components during power generation.

The processor 502 is functionally and/or communicatively coupled (e.g., through a memory bus) to memory 503 in order to store or retrieve information necessary to operate and confer functionality, at least in part, to communication platform or front end 504, the power amplifier (PA) system 510 and substantially any other operational aspects of the PA system 510.

Figure 6:
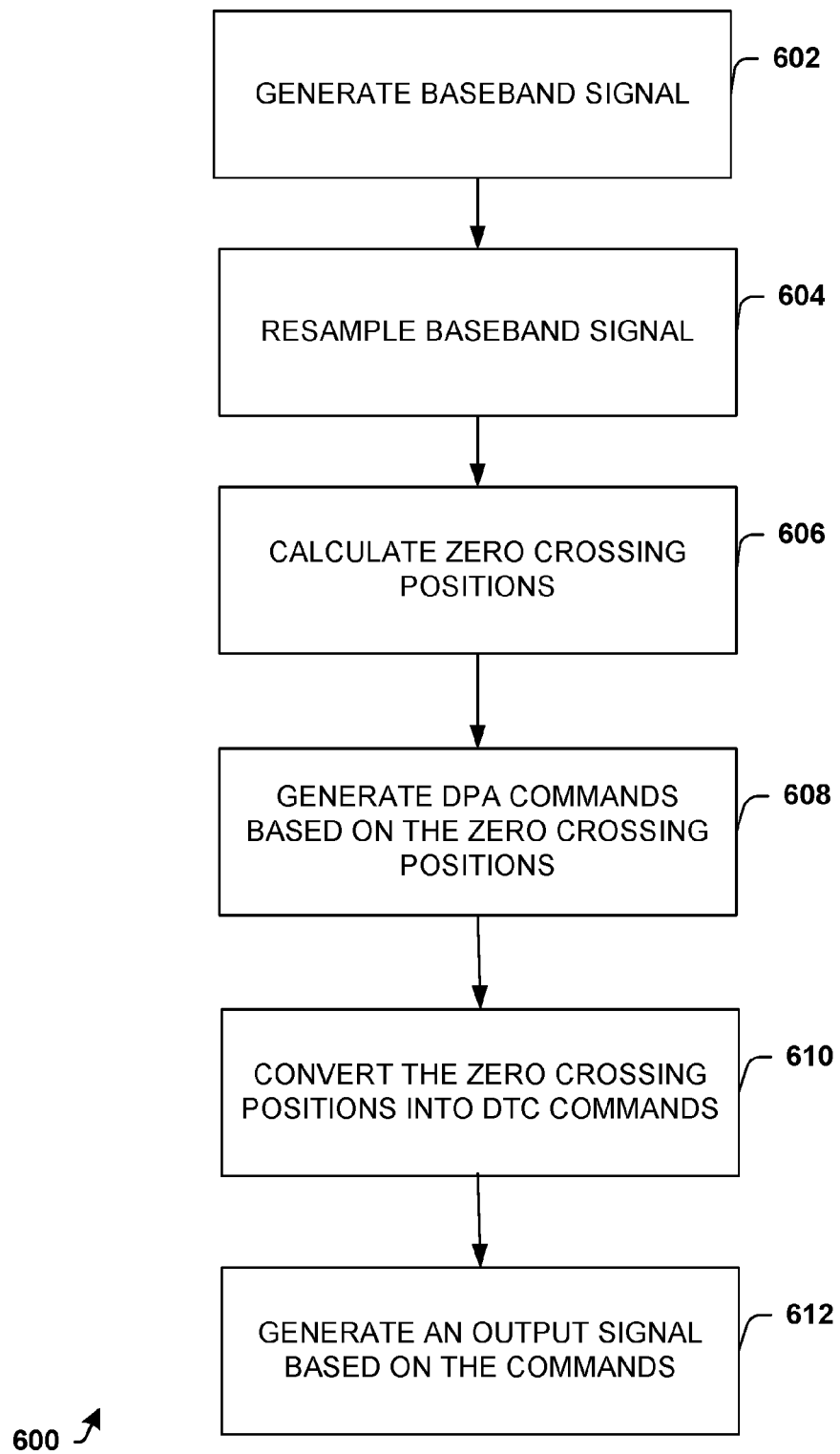
FIG. 6 is a flow diagram illustrating an exemplary method of operating a digital transmitter (DTx) in accordance with an aspect of present disclosure.

FIG. 6 is a flow diagram illustrating a method 600 of operating a digital transmitter (DTx) in accordance with an embodiment. The method 600 can be used within a transceiver, mobile device and the like for communication purposes and/or other applications.

The above systems, devices, arrangements, embodiments and the like can be referenced and used with or in conjunction with the method 600.

The method begins at block 602, wherein a baseband signal having I and Q components is generated by a modem or other device. The baseband signal is a digital Cartesian signal and the I and Q components and/or other modulation are used to convey information on the baseband signal. The baseband signal operates at a suitable frequency, such as 320 MHz, 640 MHz, and the like.

The baseband signal is resampled or sampled into carrier frequency related samples at block 604. A variable rate converter and/or a low power interpolator can be configured to resample or sample the baseband signal into carrier frequency related samples. The resampled signal can also include or be referred to as interpolated signal 120.

A digital front end (DFE) calculates and/or locates Zero Crossing positions (ZC) at block 606. In one example, the ZC positions are calculated by identifying sign changes. In another example, the positions are calculated by coarsely calculating a signal at a high sampling rate and then identifying sign changes.

ZC amplitudes are calculated at the calculated ZCs to generate DPA commands at block 608. An amplifier can be used to determine or calculate amplitude values at the identified ZC positions. The amplitude values at the ZC positions are provided as the DPA commands.

The calculated ZCs are converted to DTC commands at block 610. In one example, DTC commands are extracted or obtained from a ZC delay as determined by a ZC to DCT converter, such as the converter 212. The ZC delay is relative to a digital clock and the extraction is obtained relative to a VCO clock and the ZC delay.

A transmission chain having a DTC component and a DPA component generates an output signal using the DPA commands and the DTC commands at block 612. The DTC component generates a modulated clock based on the VCO signal 132 and the DTC commands 122. The DTC component performs phase modulation using the DTC commands to generate the modulated clock or modulated clock signal. The DPA component uses the modulated clock and the DPA commands to generate the output signal. The DPA component can include, for example, a class D digital power amplifier (DPA), which is used to generate amplitude modulation. Thus, the output signal includes phase modulation from the DTC component and amplitude modulation from the DPA component.

A band pass filter or other similar component can be used to remove unwanted noise and/or unwanted signals from the output signal. Additionally, other processing including filtering, amplification and the like can also be performed.

The output signal can then be transmitted using one or more antenna, such as by an antenna array.

It is appreciated that the method 600 can be repeated at regular or irregular intervals.

While the methods provided herein are illustrated and described as a series of acts or events, the present disclosure is not limited by the illustrated ordering of such acts or events. For example, some acts may occur in different orders and/or concurrently with other acts or events apart from those illustrated and/or described herein. In addition, not all illustrated acts are required and the waveform shapes are merely illustrative and other waveforms may vary significantly from those illustrated. Further, one or more of the acts depicted herein may be carried out in one or more separate acts or phases.

It is noted that the claimed subject matter may be implemented as a method, apparatus, or article of manufacture using standard programming and/or engineering techniques to produce software, firmware, hardware, or any combination thereof to control a computer to implement the disclosed subject matter (e.g., the systems shown above, are non-limiting examples of circuits that may be used to implement disclosed methods and/or variations thereof). The term "article of manufacture" as used herein is intended to encompass a computer program accessible from any computer-readable device, carrier, or media. Those skilled in the art will recognize many modifications may be made to this configuration without departing from the scope or spirit of the disclosed subject matter.

Examples may include subject matter such as a method, means for performing acts or blocks of the method, at least one machine-readable medium including instructions that, when performed by a machine cause the machine to perform acts of the method or of an apparatus or system for concurrent communication using multiple communication technologies according to embodiments and examples described herein.

Example 1 is a digital polar transmitter arrangement having a digital front end (DFE) and a transmit chain. The DFE is configured to resample a baseband signal relative to a carrier frequency at a carrier frequency related sample rate, calculate zero crossing positions of the resampled signal, generate delay to time converter (DTC) commands based on the zero crossing positions, calculate amplitude values for the zero crossing positions and to generate dynamic phase alignment (DPA) commands based on the amplitude values. The transmit chain is configured to generate an output signal having amplitude and phase modulation based on the DTC and DPA commands.

Example 2 includes the subject matter of Example 1, including or omitting optional elements, where the DFE includes a variable rate converter (VRC) configured to resample the baseband signal.

Example 3 includes the subject matter of any of Examples 1-2, including or omitting optional elements, where the DFE comprises a low power interpolator configured to resample the baseband signal at the carrier frequency related sample rate.

Example 4 includes the subject matter of any of Examples 1-3, including or omitting optional elements, where the DFE comprises a zero crossing finder configured to the zero crossing positions.

Example 5 includes the subject matter of any of Examples 1-4, including or omitting optional elements, where the DFE comprises a zero crossings correction component configured to apply corrections to rising and/or falling edges of the resampled signal.

Example 6 includes the subject matter of any of Examples 1-5, including or omitting optional elements, where the DFE comprises a power amplifier configured to calculate the amplitude values for the zero crossing positions.

Example 7 includes the subject matter of any of Examples 1-6, including or omitting optional elements, where the transmit chain comprises a DTC component configured to generate a modulated clock having phase modulation based on the DTC commands and a voltage controlled oscillator signal.

Example 8 includes the subject matter of any of Examples 1-7, including or omitting optional elements, where the transmit chain comprises a DPA component configured generate the output signal having amplitude modulation based on the DPA commands and a modulated clock signal.

Example 9 includes the subject matter of any of Examples 1-8, including or omitting optional elements, where the transmit chain comprises a band pass filter configured to remove noise and unwanted signals from the output signal.

Example 10 includes the subject matter of any of Examples 1-9, including or omitting optional elements, where the transmit chain comprises a band pass filter configured to remove noise and unwanted signals from the output signal.

Example 11 is a digital front end (DFE) arrangement having a variable rate converter (VRC), a low power interpolator (LPI), a zero crossing finder, a converter and an amplifier. The variable rate converter (VRC) is configured to resample a baseband signal. The low power interpolator (LPI) is configured to interpolate the resampled signal based on a carrier frequency. The zero crossing finder is configured to calculate zero crossing positions based on the interpolated signal. The converter is configured to convert the zero crossing positions into delay to time (DTC) commands. The amplifier is configured to calculate amplitude values of the interpolated signal at the zero crossing positions and generate DPA commands based on the calculated amplitude values.

Example 12 includes the subject matter of Example 11, including or omitting optional elements, further including a modem configured to generate the baseband signal as a Cartesian signal having in-phase (I) and quadrature (Q) components.

Example 13 includes the subject matter of any of Examples 11-12, including or omitting optional elements, where the VRC and the LPI operate on a carrier frequency related signal.

Example 14 includes the subject matter of any of Examples 11-13, including or omitting optional elements, where wherein the converter operates at a modulated clock.

Example 15 includes the subject matter of any of Examples 11-14, including or omitting optional elements, where the converter converts the zero crossing positions using a zero crossing delay and a voltage controlled oscillator clock.

Example 16 includes the subject matter of any of Examples 11-15, including or omitting optional elements, further including a correction component configured to calculate an edge error based on a signal having the zero crossing positions and apply a compensation based on the calculated edge error to edges of the signal and provide the signal having the applied compensation to the converter.

Example 17 includes the subject matter of any of Examples 11-16, including or omitting optional elements, further including a transmit chain configured to generate an output signal having amplitude and phase modulation based on the DTC and DPA commands.

Example 18 is a method of operating a digital transmitter. A digital baseband signal having inphase (I) and quadrature (Q) components is generated. The baseband signal is resampled at a frequency related to a carrier frequency and higher than a baseband frequency of the baseband signal. Zero crossing positions are calculated based on the resampled baseband signal having I and Q components. The zero crossing positions are converted into delay to time (DTC) commands.

Example 19 includes the subject matter of Example 18, including or omitting optional elements, further comprising calculating amplitudes values of the resampled baseband signal at the zero crossing positions to generate DPA commands.

Example 20 includes the subject matter of any of Examples 18-19, including or omitting optional elements, further comprising interpolating the resampled baseband signal prior to calculating the zero crossing positions.

Example 21 includes the subject matter of any of Examples 18-20, including or omitting optional elements, further comprising generating an output signal having amplitude and phase modulation based on the DTC and DPA commands.

Example 22 is a digital polar transmitter arrangement having a digital front end (DFE). The arrangement comprises a means to resample a baseband signal relative to a carrier frequency at a carrier frequency related sample rate, a means to calculate zero crossing positions of the resampled signal, a means to generate delay to time converter (DTC) commands based on the zero crossing positions, a means to calculate amplitude values for the zero crossing positions and generate dynamic phase alignment (DPA) commands based on the amplitude values, wherein the baseband signal is a digital Cartesian signal having inphase (I) and quadrature (Q) components, and a means to generate an output signal having amplitude and polar modulation for transmission based on the DPA commands and the DTC commands.

Example 23 is a digital polar transmitter arrangement. The arrangement includes a means for generating a digital baseband signal having inphase (I) and quadrature (Q) components, a means for resampling the baseband signal at a frequency related to a carrier frequency and higher than a baseband frequency of the baseband signal, a means for calculating zero crossing positions based on the resampled baseband signal having I and Q components, and a means for converting the zero crossing positions into delay to time (DTC) commands.

Although the invention has been illustrated and described with respect to one or more implementations, alterations and/or modifications may be made to the illustrated examples without departing from the spirit and scope of the appended claims. For example, although a transmission circuit/system described herein may have been illustrated as a transmitter circuit, one of ordinary skill in the art will appreciate that the invention provided herein may be applied to transceiver circuits as well.

Furthermore, in particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. The component or structure includes a processor executing instructions in order to perform at least portions of the various functions. In addition, while a particular feature of the invention may have been disclosed with respect to only one of several implementations, such feature may be combined with one or more other features of the other implementations as may be desired and advantageous for any given or particular application.

Furthermore, to the extent that the terms "including", "includes", "having", "has", "with", or variants thereof are used in either the detailed description and the claims, such terms are intended to be inclusive in a manner similar to the term "comprising".

What is claimed is:
1. A digital polar transmitter arrangement comprising:
   a digital front end (DFE) configured to resample a baseband signal at a frequency related to a carrier frequency,
      calculate zero crossing positions of the resampled signal,
      generate delay to time converter (DTC) commands based on the zero crossing positions,
      calculate amplitude values for the zero crossing positions, and
      generate dynamic phase alignment (DPA) commands based on the amplitude values; and
   a transmit chain configured to generate an output signal having amplitude and polar modulation for transmission based on the DPA commands and the DTC commands.

2. The arrangement of claim 1, wherein the DFE comprises a variable rate converter (VRC) configured to resample the baseband signal.

3. The arrangement of claim 1, wherein the DFE comprises a low power interpolator configured to resample the baseband signal at the carrier frequency related sample rate.

4. The arrangement of claim 1, wherein the DFE comprises a zero crossing finder configured to determine the zero crossing positions.

5. The arrangement of claim 1, wherein the DFE comprises a zero crossings correction component configured to apply corrections to rising and falling edges of the resampled signal.

6. The arrangement of claim 1, wherein the DFE comprises a power amplifier configured to calculate the amplitude values for the zero crossing positions.

7. The arrangement of claim 1, where the transmit chain comprises a DTC component configured to generate a modulated clock having phase modulation based on the DTC commands and a voltage controlled oscillator signal.

8. The arrangement of claim 1, wherein the transmit chain comprises a DPA component configured to generate the output signal having amplitude modulation based on the DPA commands and a modulated clock signal.

9. The arrangement of claim 1, wherein the transmit chain comprises a band pass filter configured to remove noise and unwanted signals from the output signal.

10. The arrangement of claim 1, wherein the baseband signal is a digital Cartesian signal having inphase (I) and quadrature (Q) components.

11. A digital front end (DFE) arrangement comprising:
a variable rate converter (VRC) configured to resample a baseband signal;
a low power interpolator (LPI) configured to interpolate the resampled signal based on a carrier frequency;
a zero crossing finder configured to calculate zero crossing positions based on the interpolated signal;
a converter configured to convert the zero crossing positions into delay to time (DTC) commands; and
an amplifier configured to calculate amplitude values of the interpolated signal at the zero crossing positions and generate dynamic phase alignment (DPA) commands based on the calculated amplitude values.

12. The arrangement of claim 11, further comprising a modem configured to generate the baseband signal as a Cartesian signal having in-phase (I) and quadrature (Q) components.

13. The arrangement of claim 11, wherein the VRC and the LPI operate on a carrier frequency related signal.

14. The arrangement of claim 11, wherein the converter operates at a modulated clock.

15. The arrangement of claim 11, wherein the converter converts the zero crossing positions using a zero crossing delay and a voltage controlled oscillator clock.

16. The arrangement of claim 11, further comprising a correction component configured to calculate an edge error based on a signal having the zero crossing positions and apply a compensation based on the calculated edge error to edges of the signal and provide the signal having the applied compensation to the converter.

17. The arrangement of claim 11, further comprising a transmit chain configured to generate an output signal having amplitude and phase modulation based on the DTC and DPA commands.

18. A method of operating a digital transmitter comprising:
generating a digital baseband signal having inphase (I) and quadrature (Q) components;
resampling the baseband signal at a frequency related to a carrier frequency and higher than a baseband frequency of the baseband signal;
calculating zero crossing positions based on the resampled baseband signal having I and Q components; and
converting the zero crossing positions into delay to time (DTC) commands.

19. The method of claim 18, further comprising calculating amplitudes values of the resampled baseband signal at the zero crossing positions to generate DPA commands.

20. The method of claim 18, further comprising interpolating the resampled baseband signal prior to calculating the zero crossing positions.

21. The method of claim 18, further comprising generating an output signal having amplitude and phase modulation based on the DTC and DPA commands.

* * * * *